(12) United States Patent
DeCoro et al.

(10) Patent No.: US 8,760,450 B2
(45) Date of Patent: Jun. 24, 2014

(54) REAL-TIME MESH SIMPLIFICATION USING THE GRAPHICS PROCESSING UNIT

(75) Inventors: Christopher DeCoro, Princeton, NJ (US); Natalya Tatarchuk, Wayland, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 942 days.

(21) Appl. No.: 12/260,606

(22) Filed: Oct. 29, 2008

(65) Prior Publication Data

US 2009/0109219 A1 Apr. 30, 2009

Related U.S. Application Data

(60) Provisional application No. 60/983,607, filed on Oct. 30, 2007.

(51) Int. Cl.
*G06T 15/30* (2011.01)
*G06T 17/00* (2006.01)
*G06T 15/00* (2011.01)

(52) U.S. Cl.
USPC ........... 345/423; 345/420; 345/419; 345/421; 345/422; 345/427; 345/428

(58) Field of Classification Search
None
See application file for complete search history.

(56) References Cited

U.S. PATENT DOCUMENTS

| | | | |
|---|---|---|---|
| 5,590,248 A | 12/1996 | Zarge et al. | |
| 5,929,860 A | 7/1999 | Hoppe | |
| 6,262,737 B1 * | 7/2001 | Li et al. | 345/419 |
| 6,583,787 B1 * | 6/2003 | Pfister et al. | 345/441 |
| 6,771,261 B2 | 8/2004 | MacPherson | |
| 6,889,176 B1 * | 5/2005 | Buttolo et al. | 703/1 |
| 7,023,437 B1 * | 4/2006 | Voorhies et al. | 345/420 |
| 2002/0042783 A1 | 4/2002 | Chang et al. | |
| 2002/0171644 A1 | 11/2002 | Reshetov et al. | |
| 2003/0011595 A1 | 1/2003 | Goel et al. | |
| 2003/0112239 A1 | 6/2003 | Shin et al. | |
| 2003/0179208 A1 * | 9/2003 | Lavelle | 345/539 |
| 2004/0130552 A1 | 7/2004 | Duluk, Jr. et al. | |
| 2007/0120851 A1 * | 5/2007 | Xie et al. | 345/423 |
| 2008/0266287 A1 * | 10/2008 | Ramey et al. | 345/419 |

OTHER PUBLICATIONS

Real-time View-Dependent Extraction of Isosurfaces from Adaptively Fefined Octrees and Tetrahedral Meshes, Fang et al., 2003.*

(Continued)

*Primary Examiner* — David Zarka
*Assistant Examiner* — Phong Nguyen
(74) *Attorney, Agent, or Firm* — Schmeiser, Olsen & Watts LLP

(57) ABSTRACT

A graphics-processing unit is used to perform mesh simplification. A vertex shader receives a dataset for an input mesh that portrays a three-dimensional graphics object. The vertex shader generates from the dataset vertices for primitives that make up the input mesh. The input mesh is divided into a grid of cells. A geometry shader receives the vertices from the vertex shader and generates from the received vertices a simplified mesh that portrays the three-dimensional graphics object in less detail than the input mesh. Before the input mesh is divided into grid cells, a warping function can be applied to the input mesh based on a weighting function to warp the input mesh, thereby increasing sampling at a region of interest. A projective warping can be performed on the grid to produce grid cells of different volumes in accordance with a camera position.

22 Claims, 10 Drawing Sheets

(56) References Cited

OTHER PUBLICATIONS

The Direct3D 10 System, Blythe et al., 2006.*
Octree Textures on the GPU, Lefebvre et al., 2005.*
Octree Textures on Graphics Hardware, Kniss et al., 2005.*
Employing Complex GPU Data Structures for the Interactive Visualization of Adaptive Mesh Refinement Data, Vollrath et al., 2006.*
View-dependent refinement of multiresolution meshes using programmable graphics hardware, Ji et al., 2006.*
Blythe, David, "The Direct3D 10 System", ACM Transactions on Graphics (TOG), Jul. 2006, 25-3, 724-734, ACM, New York USA.
Buck, Ian, "Brook for GPUs: Stream Computing on Graphics Hardware", ACM Transactions on Graphics (TOG), Aug. 2004, 23-3, 777-786, ACM, New York USA.
Eilemann, Stefan, "An Analysis of Parallel Rendering Systems", White Paper : http://www.equalizergraphics.com/documents/ParallelRenderingSystems.pdf, Jan. 11, 2007, p. 1-8, Version 0.6.
Garland, Michael et al., "Surface Simplification Using Quadric Error Metrics", International Conference on Computer Graphics and Interactive Techniques, Proceedings of the 24th annual conference on Computer graphics and interactive techniques, 1997, 209-216, ACM Press, New York USA.
Hoxley, Jack, "An Overview of Microsoft's Direct3D 10 API", Article: http://www.gamedev.net/reference/programming/features/d3d10overview/, Dec. 13, 2005, 1-7, Version 1.1.
Levoy, Marc, "The Digital Michelangelo Project: 3D Scanning of Large Statues", International Conference on Computer Graphics and Interactive Techniques, Proceedings of the 27th annual conference on Computer graphics and interactive techniques, 2000, 131-144, ACM Press, New York, USA.
Lindstrom, Peter, "Out-of-Core Simplification of Large Polygonal Models", International Conference on Computer Graphics and Interactive Techniques, Proceedings of the 27th annual conference on Computer graphics and interactive techniques 2000, 259-262, ACM Press, New York, USA.
Schaefer, Scott et al., "Adaptive Vertex Clustering Using Octrees", In Proceedings of SIAM Geometric Design and Computation, 2003, 491-500, vol. 2, SIAM, New York USA.
Shaffer, Eric et al. Efficient Adaptive Simplification of Massive Meshes, Visualization, Proceedings of the conference of Visualization, 2001, 127-134, IEEE Computer Society, Washington DC, USA.
Venkatasubramanian, Suresh, "The Graphics Card as a Stream Computer", 2003, in SIGMOD Workshop on Management and Processing of Massive Data.
Decoro, Christopher et al. "Real-Time Mesh Simplification Using the GPU", Proceedings of the 2007 Symposium on Interactive 3D Graphics and Games, Apr. 30, 2007, 161-166, Seattle Washington, USA.
Kho, Youngihn et al. "User-Guided Simplification", Proceedings of the 2003 Symposium on Interactive 3D Graphics, Apr. 27, 2003, 123-126, Monteray California, USA.
Peercy, Mark et al. "A Performance-Oriented Data Parallel Virtual Machine for GPUs", International Conference on Computer Graphics and Interactive Techniques, Jul. 30, 2006, ACM, New York, USA.
PCT International Search Report for PCT/US2008/081561, dated Apr. 8, 2009 (4 pages).

* cited by examiner

REAL-TIME MESH SIMPLIFICATION USING THE GRAPHICS PROCESSING UNIT

RELATED APPLICATION

This utility application claims the benefit of U.S. Provisional Patent Application No. 60/983,607, filed on Oct. 30, 2007, titled, "Real-Time Mesh Simplification Using the Graphics-processing unit", the entirety of which is incorporated by reference herein.

FIELD OF THE INVENTION

The present invention relates generally to computer graphics processing. More particularly, the present invention relates to systems and methods for performing real-time polygonal mesh simplification.

BACKGROUND

Massive polygonal datasets have become widely available, particularly because of advances in data acquisition. Content-authoring tools, such as ZBrush® manufactured by Pixologic of Los Angeles, Calif., enable the creation of extremely detailed art with polygon counts exceeding several hundred million triangles. However, interactive rendering of such massive geometry in computer games or other applications can be impractical due to the performance penalty for vertex throughput and the associated large memory storage requirements. As a result, mesh simplification has been an active area of research. In general, mesh simplification entails transforming an input mesh containing a number of triangles into a simplified mesh having fewer triangles that approximates well the original mesh.

Various mesh simplification algorithms have been devised to decimate a triangle mesh. Some algorithms employ vertex clustering, which involves placing an input mesh into a bounding box, and dividing the box into a grid. In a simplest case, the result is a rectilinear lattice of cubes, with all vertices in a given cube or cell being replaced with a single representative vertex (i.e., clustered). Faces that become degenerate are removed from the resulting simplified mesh. Other mesh simplification algorithms take an iterative approach, in which a series of primitive simplification operations are applied to an input mesh through intermediate simplification stages. Usually, the choice of operations attempts to minimize the incremental error incurred by the operations.

Simplification of massive datasets demands computational efficiency and effective use of available memory. Traditionally, methods developed for mesh simplification and decimation are designed with the CPU architecture and programming model in mind. Consequently, mesh simplification has been a slow, CPU-limited operation performed as a non-interactive process on static meshes.

SUMMARY

In one aspect, the invention features a method of mesh simplification comprising decimating, by a graphics-processing unit, a dataset for an input mesh that describes a three-dimensional graphics object to produce a simplified mesh that describes the three-dimensional graphics object in less detail than the input mesh.

In another aspect, the invention features a graphics-processing unit comprising a vertex shader receiving a dataset for an input mesh that describes a three-dimensional graphics object. The vertex shader is configured to generate from the dataset vertices for primitives that make up the input mesh. A geometry shader receives the vertices from the vertex shader and is programmed to generate from the received vertices a simplified mesh that describes the three-dimensional graphics object in less detail than the input mesh.

In still another aspect, the invention features computer-useable medium storing computer-readable instructions, wherein the computer-readable instructions when executed on a computer causes a graphics-processing unit of the computer to decimate a data set for an input mesh that describes a three dimensional object to produce a simplified mesh that describes the three-dimensional graphics object in less detail than the input mesh.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Traditionally, mesh simplification (or mesh decimation) has been a non-interactive process performed by algorithms restricted to execution on the central processing unit (CPU). The present invention recognizes that the large-scale parallelism of the streaming architecture of current graphics-processing units (GPUs) and the introduction of a geometry shader to GPU pipelines make the traditionally non-interactive process of mesh simplification amenable to practical, real-time interactive execution on a GPU. Graphics systems embodying the present invention have a programmable GPU that performs real-time mesh simplification. During the performance of mesh simplification, the GPU takes advantage of a geometry shader stage to use a vertex clustering method.

In addition, the use of non-linear warping functions enables a user to preserve details of select portions of the object. In one embodiment, the GPU implementation of mesh simplification uses a general-purpose data structure designed for streaming architectures, referred to herein as a probabilistic octree, to represent the vertex data. In general, the probabilistic octree achieves an efficient allocation of storage (through sparse encoding) and produces multiple levels of details simultaneously. The probabilistic octree allows for much of the flexibility of offline implementations.

The invention can be used to simplify animated or dynamically (i.e., procedurally) generated geometry directly on the GPU, to simplify meshes during pre-processing time prior to creating a distribution dataset (offline), or as a load-time algorithm, in which geometry is reduced to a level of detail suitable for display on the user's hardware at the start of the program or at a change in scene. Simplified meshes can be used for collision detection and other purposes. Additionally, the invention allows an artist to rapidly create multiple levels of detail and quickly select those appropriate for the application.

Figure 1:
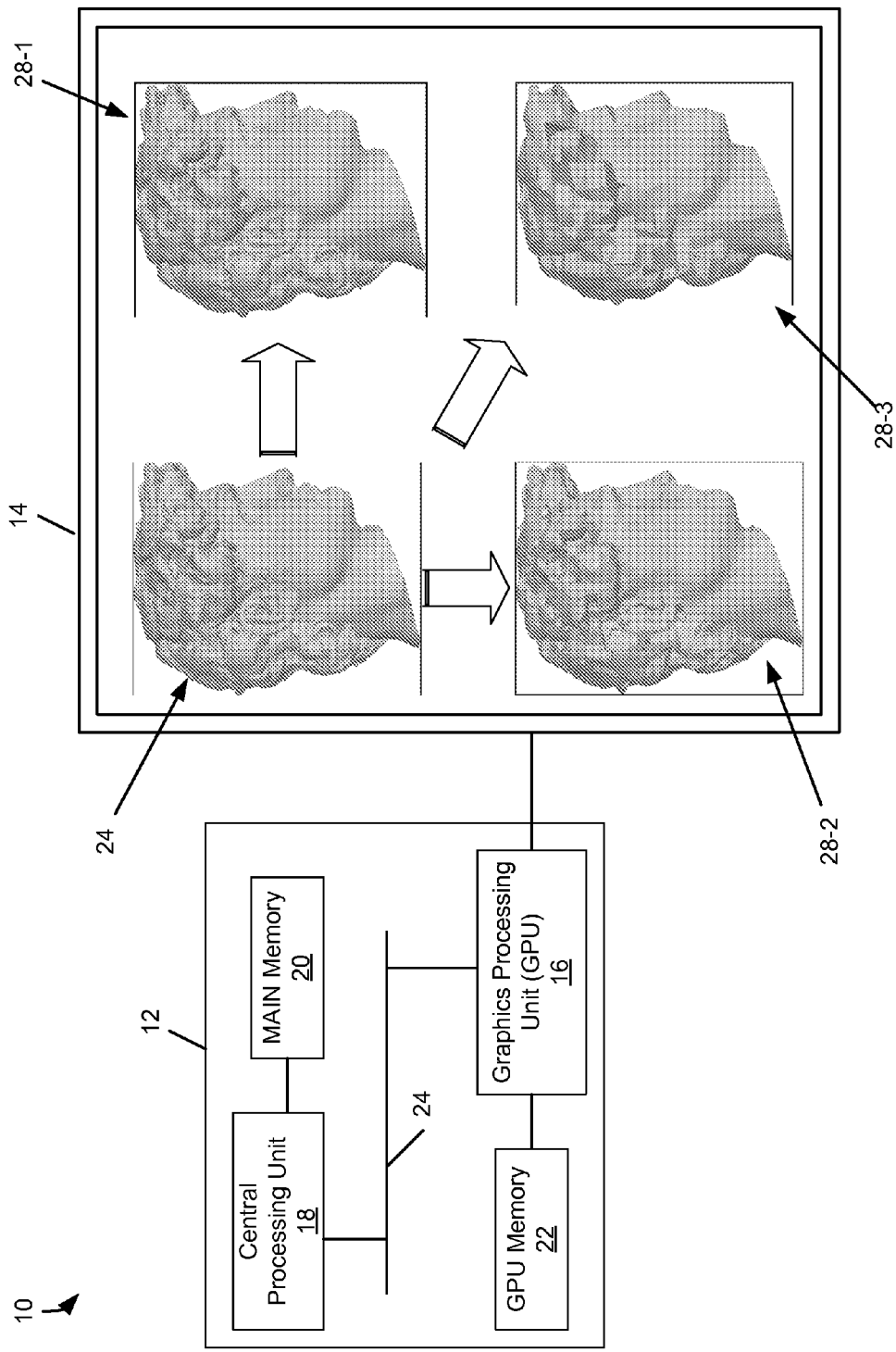
FIG. 1 is a diagram of an embodiment of a computer graphics system embodying the invention.

FIG. 1 shows an oversimplified embodiment of a video graphics system 10 in which the invention may be embodied. The video graphics system 10 includes a computing system 12 in communication with a display screen 14. Various examples of computing systems within which the present invention may be embodied include, but are not limited to, personal computers, Macintosh computers, workstations, laptop computers, server systems, hand-held devices (e.g., mobile phones and personal digital assistants), and game consoles. Although not shown, the video graphics system 10 may be connected—wired or wireless—to a network (e.g., local area network, wide area network, metropolitan area network, etc.).

The computing system 12 includes a graphics-processing unit (GPU) 16, a central processing unit (CPU) 18, main memory 20, and GPU memory 22. The GPU 16 and GPU memory 22 can reside on a graphics card. The GPU 16 can be embodied in an application-specific integrated circuit (ASIC) chip or chipset (with or without the GPU memory 22. The CPU 18 is in communication with the GPU 16 over a graphics bus 24 by which the CPU 18 issues commands and data. In one embodiment, the CPU 18 is implemented with an AMD® Athlon® processor manufactured by Advanced Micro Devices, Inc. of Sunnyvale, Calif. As will be appreciated by those of ordinary skill, the GPU 16 and CPU 18 could be embodied in a single package or in a single device (e.g., a device having a CPU and GPU cores or blocks).

The GPU 16 can be any DirectX® 10-capable or any DirectX® 10-compatible GPU, such as the Radeon HD 2000 family of devices (e.g., Radeon HD 2900, Radeon HD 2600 and the like) sold by Advanced Micro Devices of Sunnyvale, Calif. DirectX® is a collection of application program interfaces (APIs) produced by Microsoft Corporation of Redmond, Wash. for handling multimedia-related tasks on Microsoft platforms. The Directs® 10 APIs include a 3D graphics API called Direct3D 10. Alternatively, the GPU 16 can run OpenGL 3.0 APIs with similar capabilities as the Direct3D 10 APIs or run, for example, a geometry shader extension provided for OpenGL by Nvidia Corporation of Santa Clara, Calif.

In addition, the GPU 16 has a streaming computing architecture and operates as a streaming coprocessor; that is, the GPU 16 executes data-parallel operations, called kernels, on collections of data or records called streams. In general, a stream is comprised of elements (i.e. data or records) that require similar computation and can be operated on in parallel. Kernels are special functions that operate on each element of a stream. A streaming processor executes a kernel on each element of an input stream and places the results into an output stream. A technique for employing a GPU as a streaming processor is described in "Brook for GPUs: Stream Computing on Graphics Hardware", by Buck et al., 2004, ACM Trans. Graph. 23, 3, 777-786 (the contents of which are hereby incorporated herein by reference). Although FIG. 1 shows only one GPU 16, multiple GPUs on the same graphics card or on separate interconnected graphics cards can perform mesh simplification in accordance with the invention. Additionally, this algorithm can be implemented on an architecture supporting a similar programming model comprised of multiple CPU cores.

The main memory 20 includes non-volatile computer storage media, such as read-only memory, and volatile computer storage media, such as random-access memory (RAM). Within the RAM are program code and data (i.e., graphics information). Program code includes, but is not limited to, application programs, a graphics library, and an operating system (e.g., Symbian OS, Palm OS, Windows Mobile, Windows 95™, Windows 98™, Windows NT 4.0, Windows XP™, Windows 2000™, Vista™, Linux™, SunOS™, and MAC OS™). Examples of application programs include, but are not limited to, standalone and networked computer and video games, simulation programs, graphics editors, desktop publishing programs, digital sculpting tools, graphics art programs, and computer aided design programs. One or more of the application programs can perform mesh simplification in accordance with the invention.

The display screen 14 can be any monitor or screen suitable for displaying computer-graphics generated images. Examples of display screens include, but are not limited to, computer monitors, television monitors, plasma screens, liquid crystal displays (LCD), and cathode ray tube displays. In the example shown, a high-resolution three-dimensional object 24 (i.e., the "head of David") appears on the display screen 14. Objects in 3D graphics are usually represented by a web or mesh of polygons. Each polygon has various properties, such as color and texture. In this example, the object 24 is comprised of approximately 2 million faces (i.e., the exposed "face" side of a polygon).

In general, more polygons are used to represent the detail of an object when the camera is close to the object than when the camera is far away; there is little need to compute every detail of a distant object. In addition, using fewer, larger polygons improves rendering efficiency (i.e., reduces lag). Accordingly, application programs usually simplify the representation of the object for distant objects. On the display screen 14 are three mesh-simplified representations 28-1, 28-2, and 28-3 of the object 24. Each simplified mesh is an explicit representation of the object 24 at a different lower level of detail (LOD). Simplified mesh 28-1 is comprised of approximately 30 thousand faces, simplified mesh 28-2 has approximately 5 thousand faces, and simplified mesh 28-3 has approximately 1 thousand faces.

In brief overview, under the direction of an executing application program, the CPU 18 sends graphics commands to the GPU 16. The GPU 16 also receives corresponding graphics information from the memory 20 or other input sources of graphics information. Based on the received graphics commands and graphics information, the GPU 16 generates an object (such as object 24) that appears on the display screen 14.

In addition, the CPU 18 sends graphics commands to the GPU 16 to perform mesh simplification, as described in more detail below. In one embodiment, the application program is a user interactive program that enables the user to specify input parameters and other criteria to the application program and observe the results of such mesh simplification on the object in real-time. The GPU-based mesh simplification technique of the invention can generate multiple LODs of an object during a single execution of the technique. Because of its streaming computing architecture, the GPU 16 can produce the multiple LODs of a high-resolution model (such as the object 24 representing David's head) an order of magnitude faster than the CPU 18 can produce a single simplified level of detail.

Figure 2:
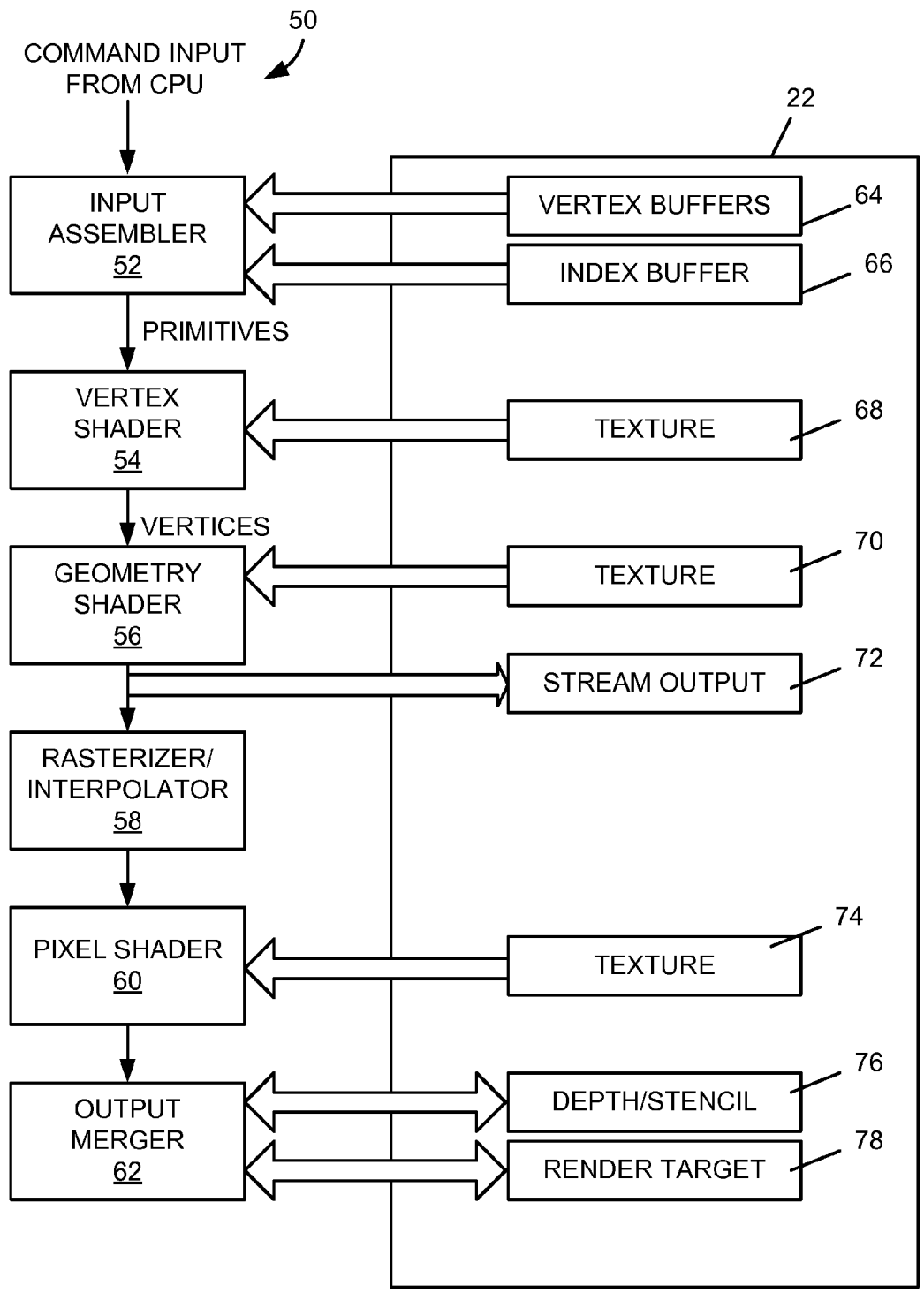
FIG. 2 is a diagram of an embodiment of a programmable rendering pipeline of a graphics-processing unit.

FIG. 2 shows an embodiment of a programmable rendering pipeline 50 of the GPU 16. The rendering pipeline 50 includes several stages, including an input assembler stage 52, a vertex shader stage 54, a geometry shader stage 56, a rasterizer stage 58, a pixel shader stage 60, and an output merger stage 62. Each stage (excepting the rasterizer stage 58) is in communication with various buffers in the GPU memory 22 (or with the main memory 20). In addition, each of the vertex shader, geometry shader, and pixel shader stages are programmable.

At the input assembler stage 52, an input assembler reads input streams of vertex data from one or more vertex buffers 64 and assembles the data into primitives. The input assembler can use an index buffer 66 to identify a vertex in a vertex buffer 64. In addition to the primitives, the input assembler generates counters for the vertices (vertex IDs) and primitives (primitive IDs). Shader stages in the pipeline 50 can use these counters to limit processing to only those primitives, instances, or vertices that have not already been processed.

The vertex shader stage 54 receives primitives from the input assembler stage 52. A vertex shader performs operations, such as transformations, skinning, morphing, and lighting, on each input vertex and produces a single output vertex. The texture buffer 68 can provide texture data that are used in the vertex shading operation.

In general, the geometry shader stage 56 operates on a per primitive basis, receiving from the vertex shader 54, as input, the vertices of a full primitive (one vertex for points, two vertices for lines, three vertices for triangles) generated. In addition, the geometry shader has access to the vertex data of the entire primitive and adjacency information of the primitive (i.e., an additional two vertices for a line, an additional three vertices for a triangle). Access to such information enables per-face computation of face quadrics required by the vertex-clustering algorithm, described in more detail below. In addition, the texture buffer 70 can provide texture data that are used at the geometry shader stage 56.

The geometry shader also has the ability to cull input primitives from the rendering stream, thereby preventing their rasterization. This capability proves useful for achieving mesh decimation. Thus, from the input vertices of a given primitive, the geometry shader can discard the primitive or generate the vertices of one or more new primitives.

An output stream of vertex data produced by the geometry shader stage 56 can pass to the rasterizer stage 58, to a stream output buffer 72 in the GPU memory 22, or to both. In one implementation, the output stream can be written to as many as four stream output buffers simultaneously. Vertex data stored in the stream output buffer(s) 72 can be read back into the pipeline 50 at the input assembler stage 52 (i.e., during a subsequent rendering pass) or at any of the shader stages 54, 56, 60, returned to the CPU 18, or combinations thereof. For example, mesh simplification techniques of the present invention compute a quadric map for each face at the geometry shader stage 56, using the stream-out functionality for storing and subsequently rendering the simplified geometry.

At the rasterizer stage 58, a rasterizer clips primitives, converts the transformed primitives to pixels, and invokes the pixel shader 60. For each primitive entering the rasterizer 58, the pixel shader 60 is invoked once for each pixel covered by the primitive. The pixel shader stage 60 receives the interpolated data for the primitive and generates per-pixel data, such as color, for each pixel that is rendered. Texture values from the texture buffer 74 may be used to generate the pixel data. The pixel shader 60 on a DirectX10-capable hardware platform can produce as many as eight 32-bit, 4-component data for the current pixel location to be combined with the render target(s), or no color if the pixel is discarded.

The output merger stage 62 generates the final rendered color of a pixel by combining the pixel data generated by the pixel shader 60 with depth and stencil values from the depth/stencil buffer 76 and with the contents of the render target(s) 78. In determining the final pixel color, the output merger stage 62 performs depth-stencil testing to determine whether a pixel is visible, and executes blending functions.

The rendering pipeline 50 can be implemented using a Direct3D 10 system, as described in "The Direct3D 10 System", by David Blythe, 2006, ACM Trans. Graph. 25, 3, 724-734 (the contents of which are hereby incorporated herein by reference), wherein are available additional details regarding the various stages of the pipeline 50.

Figure 3:
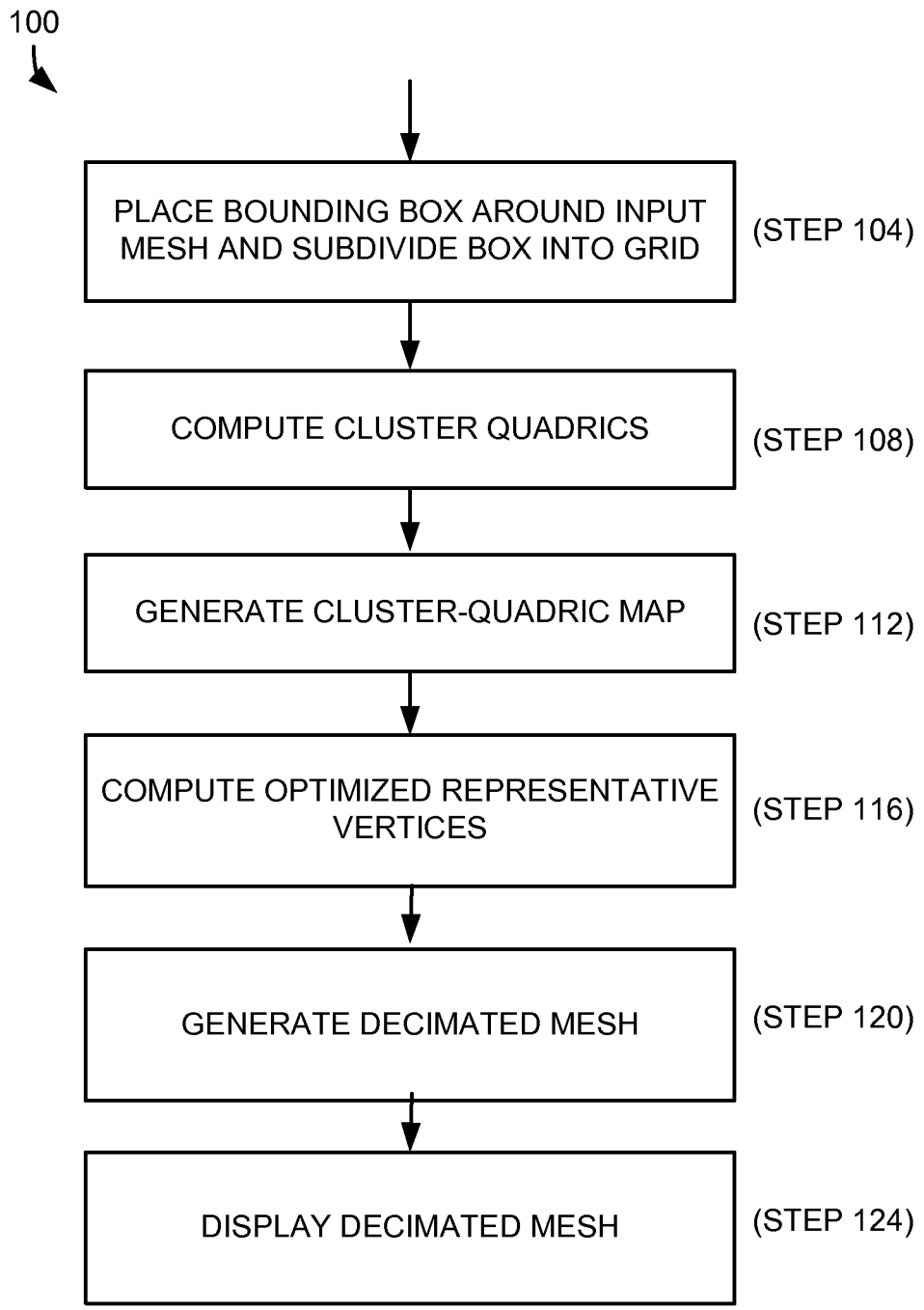
FIG. 3 is a flow diagram of an embodiment of a process for performing GPU-based polygonal mesh simplification on an input mesh.
Figure 4:
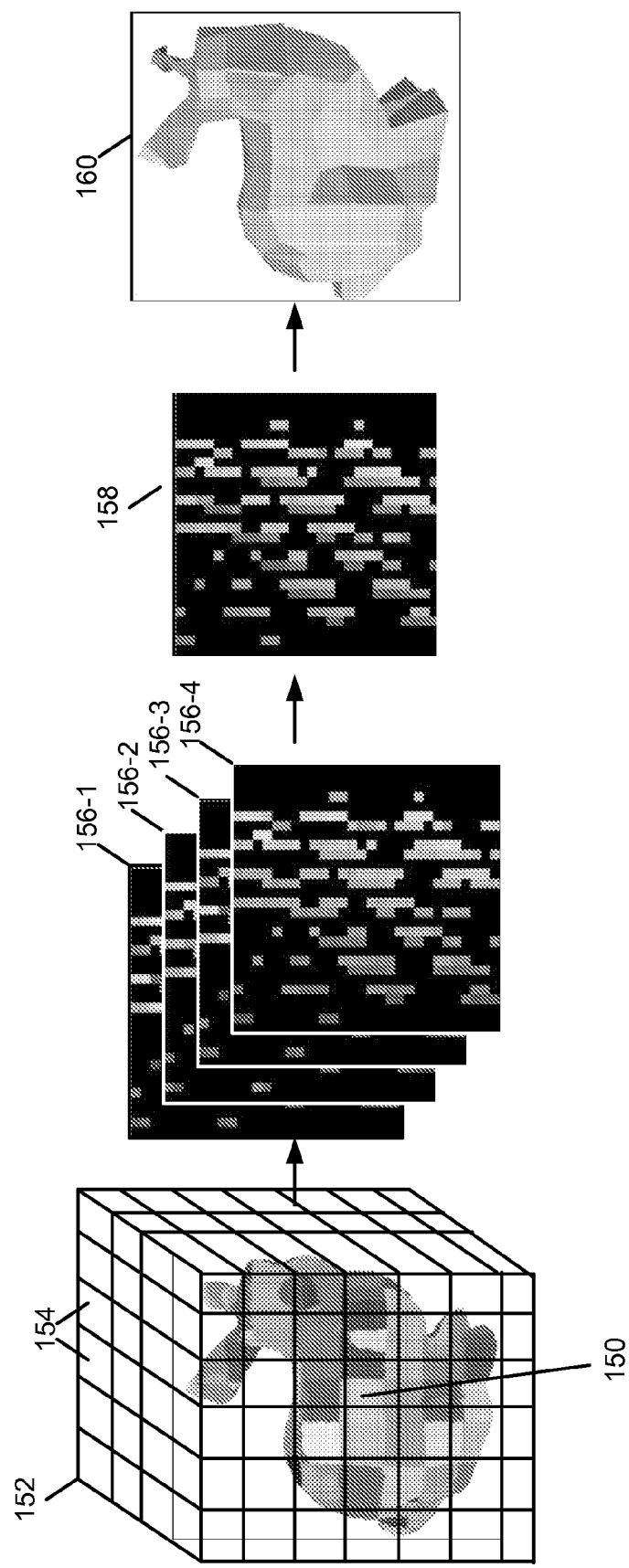
FIG. 4 is a diagram showing the various stages of mesh simplification on the input mesh.

FIG. 3 shows an embodiment of a general process 100 for performing GPU-based mesh simplification on an input mesh. In the description of the process 100, reference is also made to FIG. 4, which shows various stages of the mesh simplification process 100.

At step 104, a bounding box is placed around the original input mesh 150 and divided into a grid 152 (e.g., a 9×9×9 grid of cells). In the embodiment shown, the grid 152 is a uniform rectilinear grid (each grid cell has the same cubic dimensions). In other embodiments, described below, the grid has non-uniform geometry, is deformed in accordance with a warping function, or has a non-uniform connectivity as specified with a probabilistic octree structure.

For each grid cell 154, also called a cluster cell, a quadric error metric is computed (step 108) for each vertex in that cluster cell. The quadric characterizes the error at that vertex and can be used as a measure of mesh quality. The quadric error metric for vertex v can be defined as the point-plane distance from v to a set of associated planes:

$$f(v) = \Sigma(p^T v)^2 \qquad \text{Eq. (1)}$$

$$p \in \text{planes}(v) = v^T (\Sigma(p^T p)) v \qquad \text{Eq. (2)}$$

The need for explicit representation of the set of associated planes (p) is removed by the use of a symmetric 4×4 matrix $Q_v$, known as the error quadric. Equation (2) becomes:

$$v^T Q_v v \qquad \text{Eq. (3)}$$

The derivation and use of quadric error metrics for mesh simplification is described in more detail in "Surface Simplification Using Quadric Error Metrics", by Garland et al, the entirety of which is hereby incorporated by reference herein.

A technique for computing cluster quadrics includes performing the following for each triangle F in the input mesh:
1. Compute the face quadric $Q_F$.
2. For each vertex v in the triangle F:
   (a) Compute the cluster C containing the vertex v; and
   (b) Add $Q_F$ to the cluster quadric $Q_C$.
3. If the triangle F will be non-degenerate, output the triangle F.

The technique of computing cluster quadrics operates on each face independently, and stores only the cluster grid as a representation of the intermediate mesh. In addition, each vertex accesses a single location in the grid. This locality and data-independence allow the operations to execute efficiently in the context of out-of-core simplification and is suited for the stream computing architecture of the GPU 16. This technique is described in more detail in "Out-of-core Simplification of Large Polygonal Model", by Lindstrom, the entirety of which is hereby incorporated by reference herein.

At step 112, a cluster-quadric map is generated. The cluster-quadric map is a large 2-dimensional array used to map each cluster-cell to a cluster quadric $Q_c$. The cluster-quadric map is stored in one of the render targets in a set of render targets 156-1, 156-2, 156-3, and 156-4 (i.e., the GPU supports multiple render targets, and can write to each of the render targets during a single rendering pass).

At step 116, the optimal representative vertex is computed for each cluster based on its computed cluster-quadric $Q_c$. The resulting vertex location is stored in a render target 158, called a position map. At step 120, the decimated mesh 160 is generated based on the computed optimal representative vertices stored in the position map. The decimated mesh 160 is subsequently displayed (step 124).

In one embodiment, the process 100 involves three passes through the rendering pipeline 50 (FIG. 2), with two submissions of the input mesh 150. In one embodiment, the process 100 can execute with two passes, as described below. Because the process 100 accesses each mesh triangle only once per pass, it is unnecessary to store the entire input mesh 150 in the GPU memory 22. Accordingly, storage requirements are a function of the output mesh 160 size only, allowing the process 100 to operate efficiently with meshes of arbitrary size.

Figure 5:
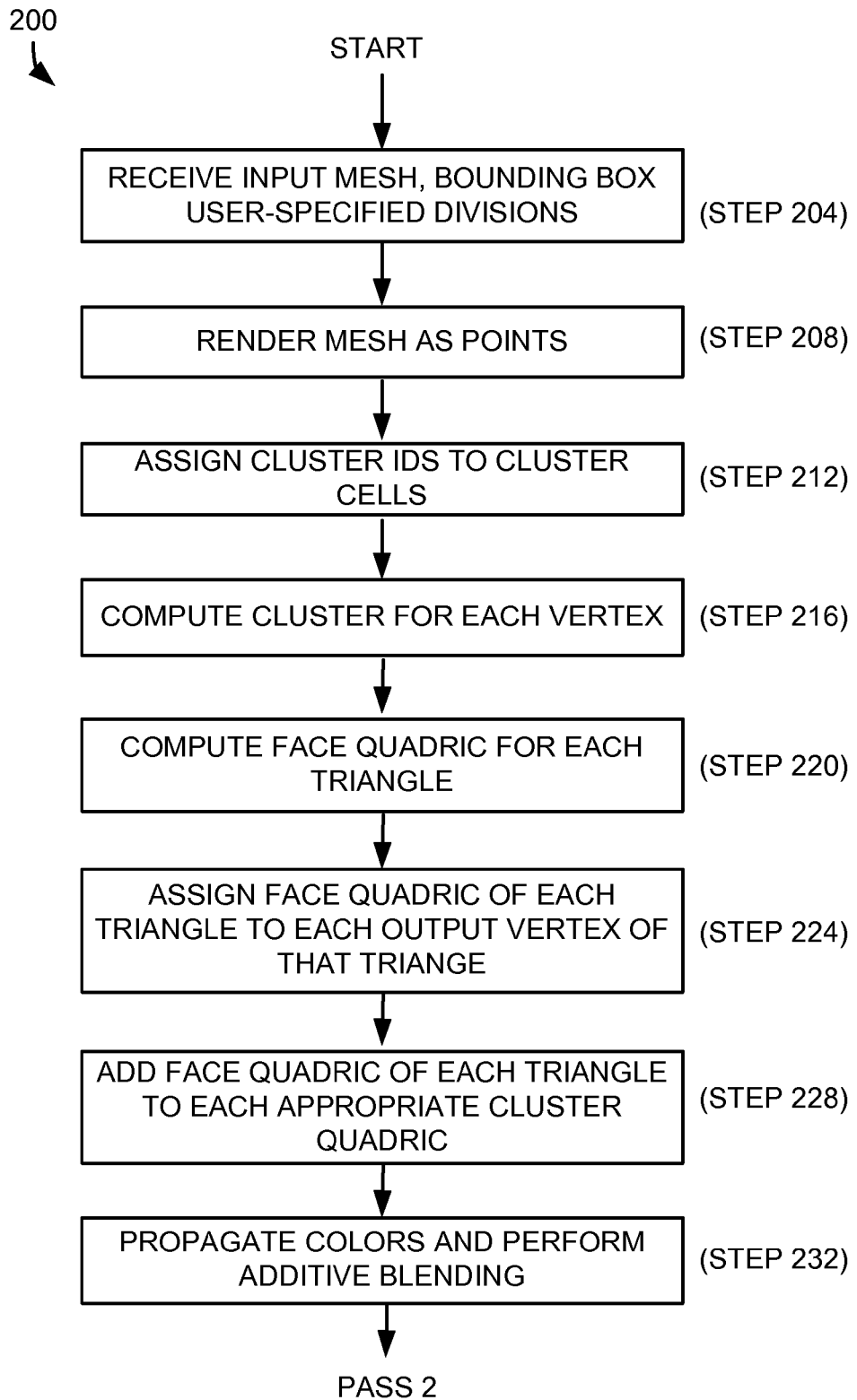
FIG. 5 is a flow diagram of an embodiment of a process for generating a cluster-quadric map.

In a three-pass embodiment of the mesh simplification process 100, the cluster-quadric map is generated during the first pass. FIG. 5 shows an embodiment of a process 200 for generating the cluster-quadric map. In the description of the process 200, reference is also made to FIG. 2 and to FIG. 4.

At step 204, the GPU 16 receives the input mesh 150, the bounding box 152, and a user-specified number of subdivisions along each dimension (such user-specified input may be a specific value or a general descriptor—e.g., "high quality", "medium quality", "low quality" or the like set by access to a user interface control or command). The input assembler 52 renders (step 208) the input mesh 150 as points. To each cluster cell 154 is assigned a unique ID (step 212), called a cluster ID. An encoded mapping (e.g., a table) uses these cluster IDs to map cluster cells 154 to cluster quadrics: the render target 78, in which are stored cluster quadrics, is referenced as a large array indexed by the cluster ID. Each location in the array (i.e., render target) stores the current sum of the error quadric $Q_c$ for that cluster cell (10 floats for the 4×4 symmetric matrix), the average vertex position within that cluster cell (3 floats), and the vertex count in that cluster cell.

The vertex shader 54 computes (step 216) the corresponding cluster for each vertex and the position of that vertex in the render target 78. The geometry shader 56, which has access to all vertices in each triangle F, uses the positions to compute (step 220) the face quadric $Q_F$ for each triangle, as described above. The geometry shader 56 assigns (step 224) the value of each computed face quadric $Q_F$ to each output vertex of the associated triangle F (the vertex is an output vertex if the triangle F will be non-degenerate).

For each output vertex, the pixel shader 60 adds (step 228) the value of the face quadric $Q_F$ assigned to that output vertex to the current value in the render target 156 of the corresponding cluster-quadric Qc associated with that output vertex. Accordingly, each cluster-quadric $Q_c$ is the sum of the quadrics of all triangles in the cluster cell. The pixel shader 60 also propagates (step 232) the computed colors, with additive blending enabled. The quadric accumulation operation (Equation 2) can be mapped to the highly efficient additive blend. The result of the first pass through the rendering pipeline 50 is a cluster-quadric map stored within the four render targets 156-1, 156-2, 156-3, and 156-4.

Figure 6:
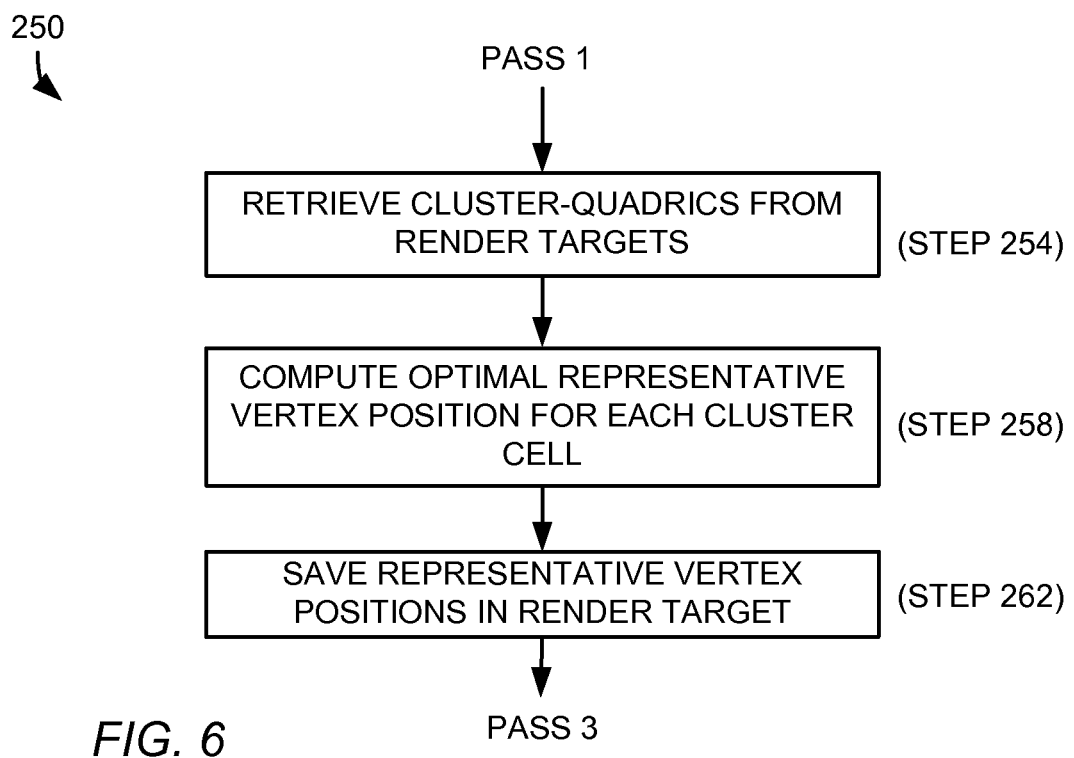
FIG. 6 is a flow diagram of an embodiment of a process for computing an optimal representative vertex position for each cluster cell.

FIG. 6 shows an embodiment of a process 250 for computing an optimal representative vertex position for each cluster cell. In a two-pass embodiment, the computation of the representative vertex positions and the decimation of the mesh occur within the same (second) pass. In a three-pass embodiment of the mesh simplification process 100, this computation occurs during the second pass. Performing the process 250 in a separate pass enables execution of this relatively expensive computation to occur exactly once per cluster with higher parallelism than if performed in combination with mesh decimation. In the description of the process 250, reference is made again to FIG. 2 and to FIG. 4.

In brief, during the second pass the optimal representative vertex position for each cluster cell is computed and stored in a render target 158 for use during the next pass. Using the cluster-quadric map generated during the first pass, the pixel shader 60 retrieves (step 254) the values of the error quadrics $Q_c$ from the render targets 156 and computes (step 258) the optimal representative vertex position for each cluster cell 154. The representative vertex position is saved (step 262) into a render target 158, which is used in the next pass.

In the computation of the representative vertex positions, the pixel shader 60 solves a quadric error equation with a matrix inversion (as described in Lindstrom above). The optimal representative vertex position for a cluster cell is the position that minimizes the sum of squared volumes of the tetrahedron formed by the vertex position and the triangles in the cluster cell. A determinant test for singularity is performed. If the matrix determinant is less than a user-specified threshold (e.g., $1 \cdot e^{-10}$), the quadric is considered non-invertible. For such a case, the average vertex position for that cluster cell is used for the representative vertex position.

Figure 7:
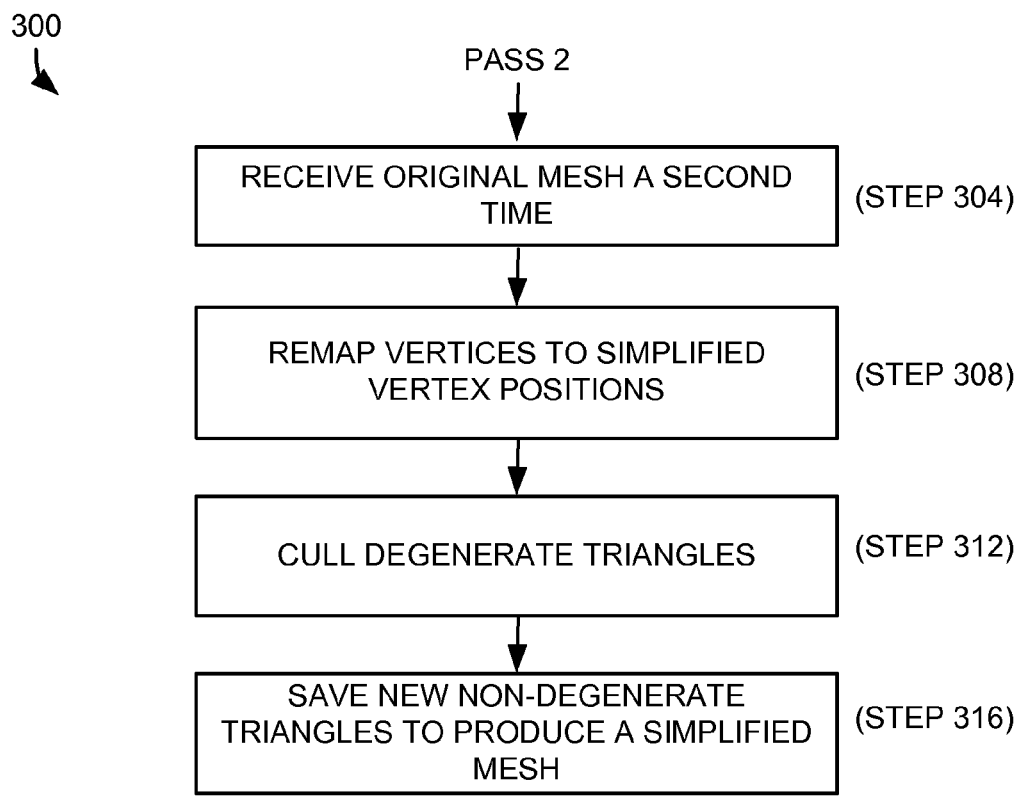
FIG. 7 is a flow diagram of an embodiment of a process for decimating the input mesh during a second or third pass of the mesh simplification process of FIG. 3.

FIG. 7 shows an embodiment of a process 300 for decimating the input mesh during the second or third pass, depending on the embodiment, of the mesh simplification process 100. At step 304, the rendering pipeline 50 (beginning at the input assembler 52) receives the original mesh 150, as the input mesh, for a second time. The vertex shader 54 remaps (step 308) the vertices of the original mesh 150 to the simplified (i.e., representative) vertex positions, and computes (step 312) the corresponding cluster cell for each simplified vertex position. The geometry shader 56 culls (step 316) those triangles that become degenerate because of the remapping.

To cull triangles, the geometry shader 56 determines if the three vertices of a remapped triangle are in different cluster cells. If the three vertices are not in three different cluster cells, the geometry shader 56 culls the triangle. Otherwise, the geometry shader 56 retrieves the simplified vertex positions from the render target 158 produced during pass 2. These retrieved vertex positions become the vertex positions of the new triangle. The geometry shader 56 streams (step 320) the vertex positions of the new triangle to the stream output buffer 72 for subsequent use (e.g., rendering for display, further simplification). The vertices of the resulting new triangles stored in the stream output buffer 72 comprise a simplified version of the original input mesh 150.

Multiple Levels of Detail

During the mesh simplification process 100, multiple levels of detail can be computed for the same input mesh 150 without repeating each of the three passes. When the resolution of the sampling grid is reduced by half, we can omit Pass 1, and instead create the quadric cluster map by appropriate down-sampling of the higher-resolution quadric cluster map. Pass 2 operates as before; however, Pass 3 can use the previously simplified mesh as its input (rather than the full resolution input mesh) as the connectivity is the same. This allows the construction of a sequence of LODs significantly faster than incurring the full simplification cost for each LOD independently.

Adaptive Simplification

A level of adaptivity is achievable in the mesh simplification process by using smooth, non-rigid warping functions to deform the cluster grid. Applying such functions during the generation of the cluster-quadric map (i.e., pass 1) can produce a higher sampling rate in desired regions of the mesh than in regions of less interest. In addition, applying arbitrary, non-linear functions during decimation (i.e., pass 3) as a warping guide can further tailor the mesh simplification process. In practice, the inverse warp function is applied to the vertices when computing cluster coordinates. A change to the mesh simplification pipeline is the computation of cluster IDs from vertex positions. The vertex positions used for the computation of error quadrics are unchanged, as is also the storage of the grid.

One application of adaptive simplification, referred to as view-dependent simplification, is to preserve greater detail in regions of the mesh that are closer to the viewer than those regions that are farther away, as defined by a provided warping function. A simple and efficient function is to apply the current frame's world-view-projection transformation into screen space. This is equivalent to performing a projective warp on the underlying cluster grid.

Figure 8B:
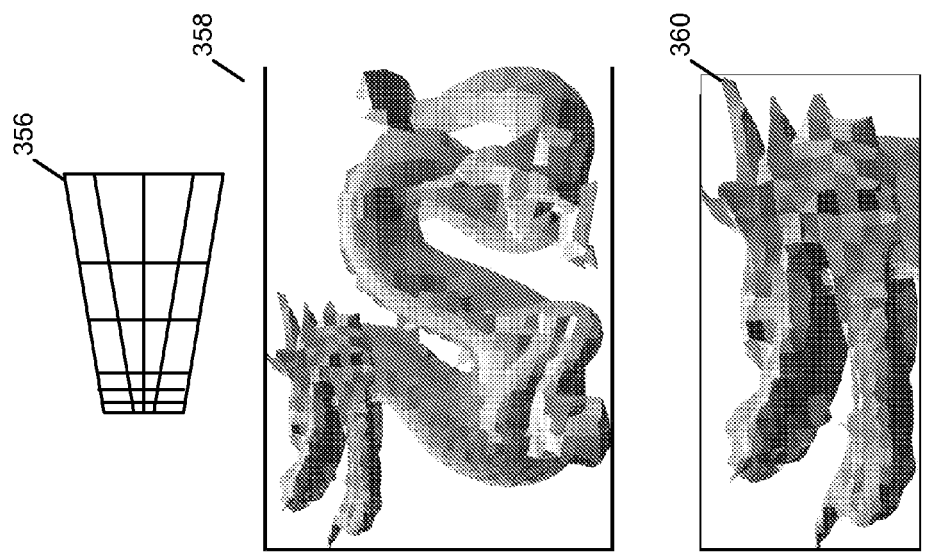
FIG. 8A and FIG. 8B are a diagrammatic comparison between view-independent simplification and view-dependent simplification.
Figure 8A:
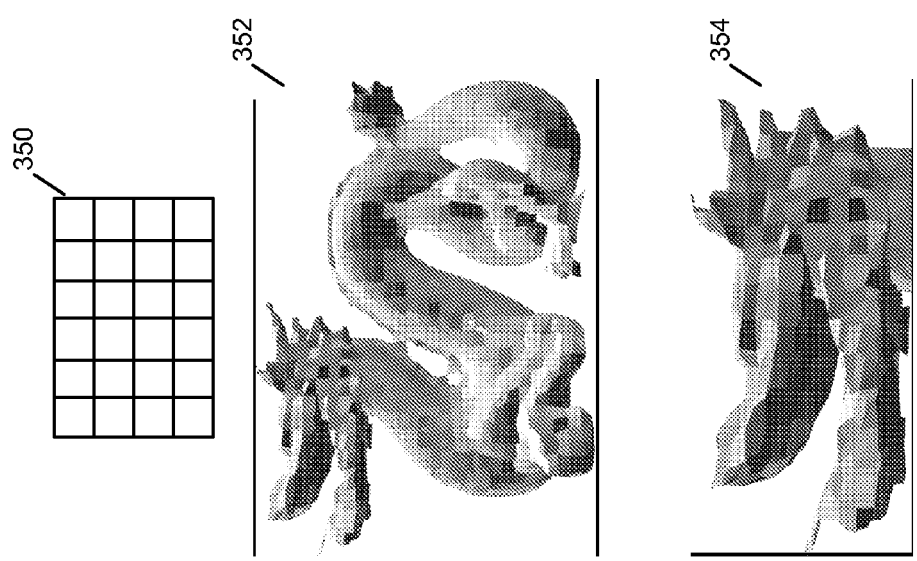

FIG. 8A and FIG. 8B show a comparison between view-independent simplification and view-dependent simplification. A dragon model (not shown) is simplified using both methods. The view-independent simplification (FIG. 8A) applies a uniform grid 350 to perform a uniform simplification of the dragon model. The results of the simplification are simplified dragon model 352 and a call-out of its dragon head 354. The view-dependent simplification (FIG. 8B) employs a camera position on the left of the dragon model, as represented by the non-uniform grid 356. As a result, those regions of the resulting simplified dragon model 358 that are closer to the camera are preserved in higher detail than those regions farther away. For instance, the call-out of the dragon head 360 resulting from the view-dependent simplification has more preserved detail than the dragon head 354 of the view-independent simplification. Application of this warping function can be meaningful for simplification on animated meshes in real-time scenarios.

Figure 9:
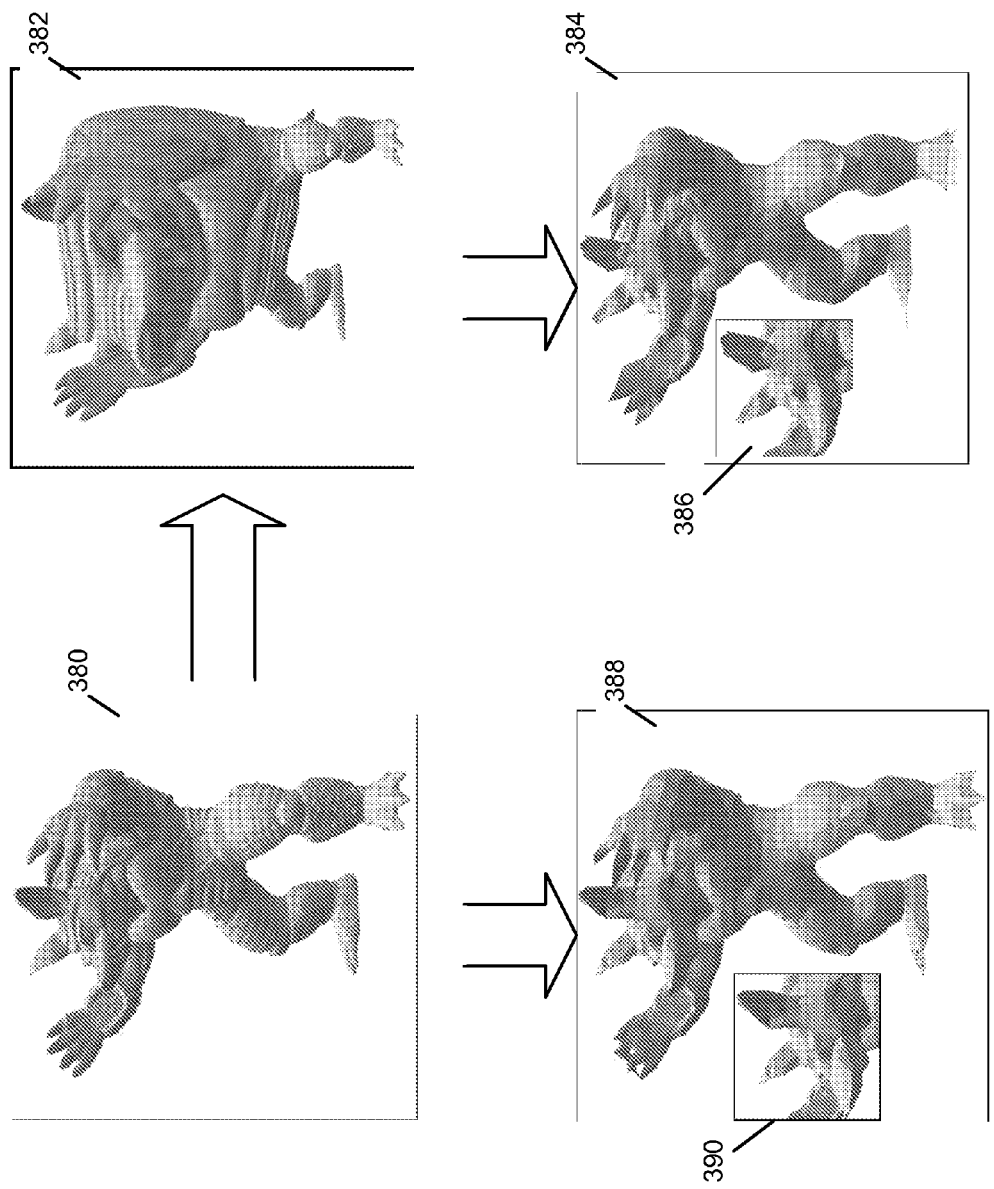
FIG. 9 are diagrams illustrating an example of area-of-interest simplification.

Another application is for region-of-interest simplification, where the user (such as an artist or programmer of an application such as a game or other visually intensive application) selects regions to be preserved in higher detail. In FIG. 9, an input mesh 380 is simplified using both a uniform grid and an adaptive grid. In order to preserve detail around a particular region (for this example, the head), the input mesh 380 is warped according to a warp function to produce a warped input mesh 382. In effect, this warping provides a higher sampling around the region of interest than for the remainder of the input mesh, thus preserving detail around the head. The resulting warped input mesh 382 is clustered (i.e., simplified) to produce the adaptively simplified mesh 384. The insert 386 shows the head of the adaptively simplified mesh 384 in detail. For comparison purposes, the input mesh 380 undergoes uniform simplification to produce uniformly simplified mesh 388. The insert 390 shows the detail of the head of the uniformly simplified mesh 388. A comparison of the two inserts 386, 390 shows that the warping function has produced a simplified mesh with greater detail at the head than through uniform simplification.

To guide the region-of-interest simplification, a Gaussian weighting function, $f(x)$, is centered at the point of interest. A warping function, $F(x)$, is derived in accordance with the weighting specified by $f(x)$. Preferably, such a warping function $F(x)$ separates points with larger values of $f(x)$ farther from their neighboring point. Additionally, such a warping function $F(x)$ is one-to-one with the weighting function $f(x)$, and spans the range $(0, 1)$.

Figure 10:
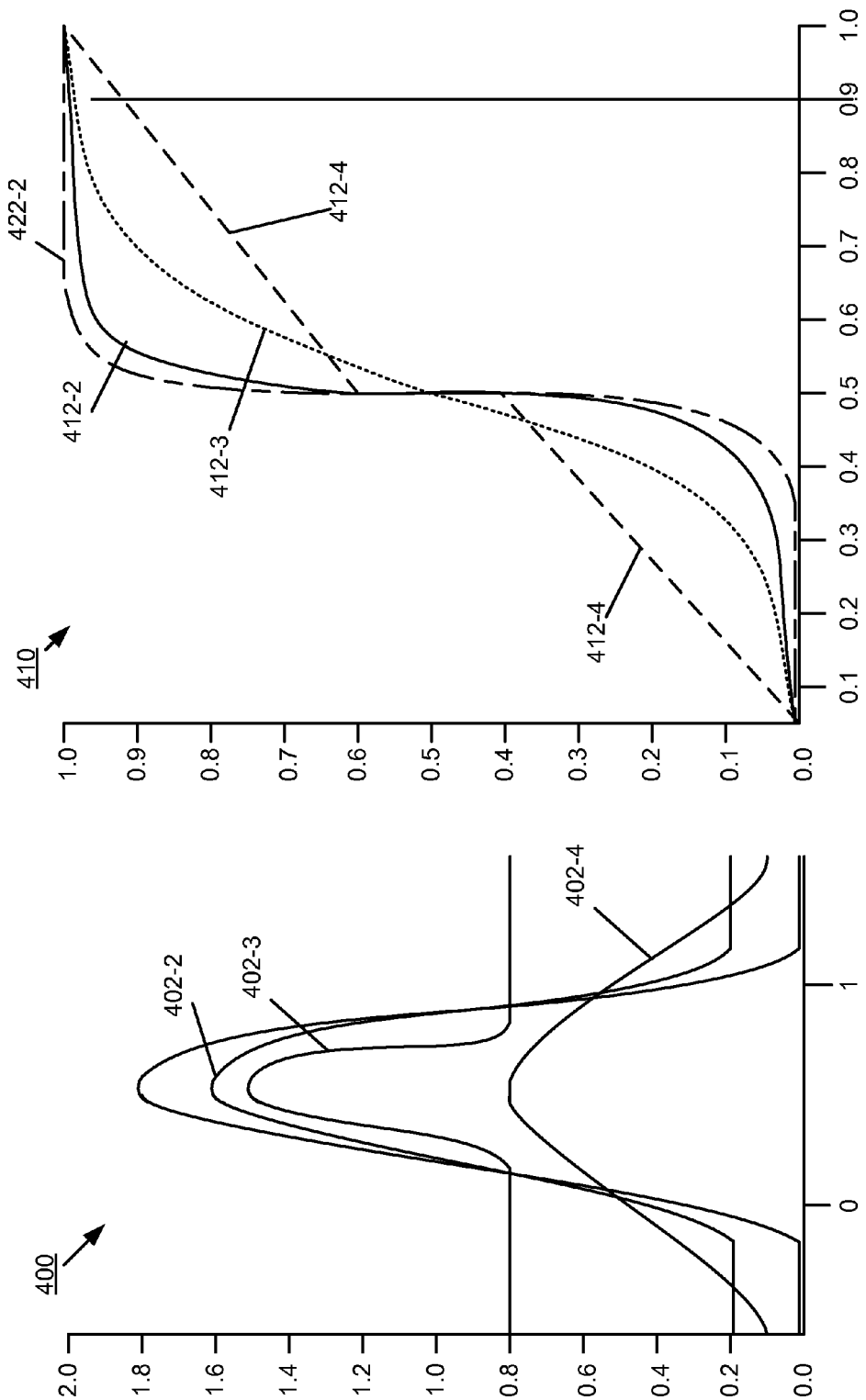
FIG. 10 is a diagrammatic representation of example weighting functions at various parameters, and their corresponding warping functions.

FIG. 10 shows a first graph 400 with a set of example weighting functions 402-1, 402-2, 402-3, 402-4 at various parameters, and a second graph 410 of their corresponding warping functions 412-1, 412-2, 412-3, 412-4. Warping function 412-1 corresponds to weighting function 402-1; warping function 412-2 corresponds to weighting function 402-2; warping function 412-3 corresponds to weighting function 402-3; and warping function 412-4 corresponds to weighting function 402-4.

An input vertex coordinate (x-axis) is mapped to a location in the warped mesh (y-axis). Values near the mean ($\mu$=0.5) are mapped to a wider range in the output than those points farther away from the mean. The weighting and warping functions can be derived as follows:

$$f_{\mu,\sigma,b}(x) = (1-b)G_{\mu,\sigma}(x) + b \quad (4)$$

$$\hat{F}_{\mu,\sigma}(x) = \int_{-\infty}^{x} G\mu, \sigma(t)dt \quad (5)$$

$$= \frac{1}{2}\left(1 + \mathrm{erf}\frac{x-\mu}{\sigma\sqrt{2}}\right) \quad (6)$$

$$F_{\mu,\sigma,b}(x) = \frac{\hat{F}_{\mu,\sigma}(x) - \hat{F}_{\mu,\sigma}(0)}{\hat{F}_{\mu,\sigma}(1) - \hat{F}_{\mu,\sigma}(0)}(1-b) + bx \quad (7)$$

In this definition, $G_{\mu,\sigma}(x)$ is the standard normal distribution, and $\mathrm{erf}(\cdot)$ is the Gauss error function. A bias parameter b sets a minimum weighting for regions outside the area of interest (setting b=1 is equivalent to uniform sampling). In FIG. 10, for the weighting function 402-1 the bias parameter b=0 and $\sigma^2$=0.5; for the weighting function 402-2 the bias parameter b=0.2 and $\sigma^2$=0.5; for the weighting function 402-3 the bias parameter b=0.8 and $\sigma^2$=0.1; and for the weighting function 402-4 the bias parameter b=0 and $\sigma^2$=0.2.

Note that $\hat{F}$ can be viewed as the cumulative distribution function corresponding to $f$, which is translated and scaled to the unit square to produce the warping function $F(x)$. Note that the function in Equation 7 is currently limited to warps that are separable in x, y and z. It is to be understood, though, that the method supports more general warps, such as those defined by arbitrary splines or radial basis functions.

Probabilistic Octrees

The use of a uniform grid requires that the user fix the resolution before mesh simplification, and does not easily allow for uneven levels of detail across the resulting simplified mesh (notwithstanding the previously described use of warping functions). Additionally, because of the need for direct, constant-time access to the grid, the data are stored in a large fixed-allocation array so that the address can be computed directly, regardless of the number of clusters that are actually occupied.

A multi-resolution grid with multiple levels, from lowest to finest resolution, addresses these concerns. Each level has twice the detail of the previous level in each dimension ("octree subdivision"). Each grid cell stores the estimate of the error quadric for a cluster of a certain scale. When mapping an input vertex to a cluster in the decimation pass (Pass 3), the representation allows the algorithm to use finer scales in areas with greater detail.

Additionally, rather than allocating all of the potential grid cells for a given level, a fixed amount of storage is allocated, and a spatial hash function is used to access the elements in constant time. This implies that not all clusters will be stored, but that there is a probability of storage, which is estimated to be the ratio of stored clusters to allocated space. However, the hierarchical structure allows for a graceful degradation by maintaining a lower resolution estimate. The structure, referred to herein as a probabilistic octree, avoids the sequential read-modify-write access and dynamic memory used in traditional octrees, and is well-suited for the massively parallel processing (for example, on GPU). Note that this general-purpose structure is not limited to the application of vertex clustering.

Operations

The octree defines the high-level ADDVERTEX(v) and FINDCLUSTER(v) operations, used in Pass 1 and 3, respectively, which act on vertex positions. These operations use low-level operations, called WRITE(k;d) and d=READ(k), to write or read the data value d into the array render-target at location k. Writing to the render targets occurs with additive blending enabled, so as to accumulate the quadric values in a cluster.

Probabilistic Construction

When generating the octree during pass 1, the ADDVERTEX operation executes on each vertex v to insert its quadric into the octree. In a tree with maximum depth $l_{max}$, a vertex has $l_{max}$ potential levels in which that vertex can be placed. One implementation of ADDVERTEX(v) makes $l_{max}$ passes to assign the vertex v to each possible level, resulting in the most accurate construction of the entire tree. This causes the decimation time to grow proportionally.

Alternatively, a given cluster quadric $Q_c$ can be considered to be the result of integrating the quadrics $Q_x$ at each point x on the surface contained in C, scaled by the differential area dA. In performing the vertex clustering algorithm on a finitely tessellated mesh, this quantity is approximated by taking a sum of the vertex quadrics $Q_v$ contained in C. The vertex quadrics $Q_v$ are computed from their adjacent face quadrics $Q_f$ and corresponding areas $A_f$.

$$Q_c = \int_{x \in C} Q_x dA \approx \sum_{v \in C} \sum_{f \in adj(v)} Q_f(A_f/3)$$

This approximation can be made with fewer samples than the entire set of those available. In a highly tessellated mesh, each cluster has many samples with which to estimate the cluster quadric. Thus, the level of each vertex is randomly selected, and that vertex is assigned to the array accordingly using the WRITE operation.

Because of the hierarchical nature of the octree structure, the higher levels (larger scales) contain more samples than the lower levels, and a better estimate of the cluster quadric can be made with a smaller fraction of the total vertices than for lower levels. Instead of using a uniform random distribution, the level for each vertex is selected according to a probability mass function that grows exponentially with increasing level. As there are exponentially fewer octree nodes at lower levels than at higher levels, the sampling rate remains roughly equal.

As with any Monte Carlo approximation, more samples (equating to more passes per vertex) lead to a better approximation than less samples, but this is not necessary for highly tessellated models, and an octree can be constructed in a single pass.

Probabilistic Storage

As with the uniform grid, the octree levels are stored in fixed-size render targets, representing 2 dimensional arrays; the array is divided into sections for each level. After ADDVERTEX(v) has selected the level in which to store the vertex v, this operation can compute the appropriate array index k as if the cluster was densely stored, invoking WRITE(k; v) to store the value. To achieve sparse storage, fewer nodes are allocated than would be necessary for storage of the entire level. The WRITE operation uses a uniformly distributing hash function to assign a storage location to the array index k. Therefore, the probability that the WRITE(k;d) operation will be successful is expected to be equal to the percentage of occupied nodes in that level. This probability can be a parameter to the algorithm, with the allocation size adjusted accordingly. Note that if the sparse storage property of the octree is not important for the application, the array can be allocated such that the storage probability at each level is 1.

Accessing the Octree

After the octree is generated in Pass 1, we use FINDCLUSTER(v) in Pass 3 to determine a corresponding cluster and scale for vertex v, which is then mapped to the representative vertex. The FINDCLUSTER operation uses a user-specified error tolerance to select the appropriate scale. This operation performs a traversal from the root of the octree (or from a node of user-specified depth $l_{min}$>0, to avoid traversing very low detail regions of the octree). The operation recognizes that a cluster at any given scale may be unoccupied (no vertex was assigned; indicated by initializing the render target to a flag value) or that there may be another cluster assigned to the same position as a result of a hash collision (described). By varying the error threshold, multiple LODs can be produced without generating a new octree.

The use a multi-resolution structure mitigates the effect of missing values. The probabilistic implementation of the ADDVERTEX operation maintains the property that each point in space is represented by a node in the structure; only the scale is uncertain. If a node is absent at a particular scale, there is a high probability that the parent node will be available, causing the algorithm only to fall back to a slightly less detailed approximation of that point.

Traversal of the octree can be accelerated by using a binary search across the different scales. As the tree depth is O(log NC), where NC is the total number of clusters, a (probabilistic) binary search over the depth reduces lookup time complexity to O(loglog NC).

Detecting Hash Collisions

Because each tree level is implemented with a hash table, hash collisions, where two octree nodes map to the same address in the array, are a possibility. A direct solution is for the WRITE(k;d) operation to record the key k along with the data in storage, allowing READ(k) to determine whether or not it has encountered a collision by a comparison. In the present system, this direct approach cannot be used because of a limitation on fixed function additive blending required to accumulate the quadrics. Therefore, a max blending mode is used for the alpha component only, and the key k is written to one render target and −k is written to the other render target, effectively using the second render target to perform a min operation. The READ(k) operation checks that the values are equal to k and −k, respectively.

Geometry Shader Stage

Current embodiments of the geometry shader stage can only generate individual primitives or lists by way of a stream output. Once the output stream of vertex data is generated, there is no vertex reuse because of the lack of associated index buffers for GPU-generated data. This lack affects the performance of post-stream out rendering passes Extending the graphics API to allow an indexed stream output (i.e. the ability to stream out primitives and their indices from each geometry shader invocation) would improve decimated mesh rendering performance. This indexing can be accomplished by providing an additional mode for the geometry shader stage, namely, an indexed stream output that is fully orthogonal to the regular stream output path. Each geometry shader specifies the actual number of output vertices at the beginning of each geometry shader invocation before emitting the indexed stream output. Thus, the hardware is able to allocate an appropriate amount of storage for each invocation, and allocate the number of indices generated by this invocation.

Programmable Blend Stage

A fixed function additive blend is used for accumulating cluster quadrics during quadric map computations. However, fixed function additive blending can prevent the implementation of accurate hash collision handling for probabilistic octrees. A programmable blend stage can extend the present functionality beyond a fixed function blend stage, similar to pixel shader functionality. With flow control and simple ALU (Arithmetic Logic Unit) computations, hash collisions can be handled accurately. Thus, if a given octree node being stored has lesser priority than the octree node currently stored in the destination buffer, the given octree node could be culled by the blend shader. An octree node with greater priority than the currently stored octree node overwrites that stored value. Values accumulate for an octree node of equal priority to the currently stored octree node.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#. Additionally, processors capable of the functions and operations described above may be code in a hardware descriptor language (HDL) that is then synthesized and further processed to enable the manufacture of such processors.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims. For example, the use of non-uniform grids has a much broader range of uses than those presented herein. One application is the use of multi-pass mesh simplification: a first pass clusters vertices on a uniform grid to make an estimate of surface complexity; a second pass uses this estimate to produce an adaptive grid, represented with a BSP (binary space partitioning) tree. This same approach can be used to generate a warping function for a non-uniform grid, achieving adaptive simplification while remaining applicable to the streaming architecture. In addition, the probabilistic octree structure has practical use in other applications. This structure allows for dynamic octree generation that can be used in the context of collision detection, ray tracing, frustum and back-face culling, and other applications for which octrees are commonly used.

The invention claimed is:

1. A method of mesh simplification, the method comprising:
  decimating, by a graphics-processing unit, a data set for an input mesh that describes a three dimensional object, the data set including data that is represented by a probabilistic octree on the graphics-processing unit, wherein decimating the data set for the input mesh includes:
    providing the data set for the input mesh in a first pass and a third pass of first, second, and third passes of multiple passes through the pipeline of the graphics-processing unit, wherein each mesh triangle in each pass through the pipeline is accessed once;
    generating the probabilistic octree, generating a quadric map, and computing a cluster for each vertex of the input mesh at the first pass of the multiple passes;
    computing, at the second pass of the multiple passes, an optimal vertex position of each cluster using the quadric map generated at the first pass and storing the optimal vertex position for use in the third pass;
    inputting the input mesh through the pipeline a second time and decimating the data set of the input mesh at the third pass of the multiple passes; and
    computing multiple levels of detail for the input mesh without repeating each of the multiple passes; and
  producing, at the graphics-processing unit, in response to decimating the data set for the input mesh, a simplified mesh that describes the three-dimensional object in less detail than the input mesh.

2. The method of claim 1, further comprising:
  dividing the input mesh into a grid of cells;
  mapping, by the graphics-processing unit, each vertex of the input mesh to the grid cell in which that vertex lies;
  assigning each grid cell to a memory location;
  computing an error quadric for each vertex;
  accumulating the error quadric computed for each vertex in the memory location assigned to the grid cell to which that vertex maps.

3. The method of claim 2, further comprising:
  computing, by the graphics-processing unit, a representative vertex position for each grid cell based on the error quadric accumulated for that grid cell.

4. The method of claim 3, further comprising:
  remapping in the third pass of the multiple passes, by the graphics-processing unit, vertices of the input mesh input through the pipeline the second time to the representative vertex positions;
  removing degenerate primitives that result from the remapping of vertices to leave new primitives that produce the simplified mesh; and storing the simplified mesh in a stream out buffer of a geometry shader for use in a subsequent rendering pass.

5. The method of claim 1, wherein the simplified mesh includes the multiple levels of detail.

6. The method of claim 2, further comprising generating the grid of cells by performing a projective warping to a uniform rectilinear grid based on a camera position to produce a grid with cells of different volumes in accordance with the camera position.

7. The method of claim 2, further comprising applying a warping function to the input mesh based on a weighting function to warp the input mesh before the input mesh is divided into a grid of cells.

8. The method of claim 7, further comprising:
dynamically receiving user input that identifies a region of interest in the input mesh; and
selecting a warping function that produces a higher sampling at the region of interest than at other regions of the input mesh.

9. The method of claim 1, wherein said decimating comprises decimating in response to a command, wherein said command comprises at least one of a user interface command and a command issued by an executing application program.

10. The method of claim 1, further comprising:
subdividing the input mesh into a grid of cells with multiple levels of resolution;
allocating a fixed amount of memory locations for each level of resolution;
randomly selecting one of the levels of resolution for each vertex of the input mesh;
computing an error quadric for each vertex;
storing the error quadric computed for each vertex in a given memory location allocated for the level of resolution randomly selected for that vertex if the given memory location is not currently storing the error quadric of another vertex.

11. A graphics-processing unit comprising:
a vertex shader receiving a dataset for a polygonal input mesh that describes a three-dimensional graphics object, the vertex shader being configured to generate from the dataset vertices for primitives that make up the input mesh, the data set including data that is represented by a probabilistic octree on the graphics-processing unit; and
a geometry shader receiving the vertices from the vertex shader, the geometry shader being programmed to generate from the received vertices a simplified mesh that describes the three-dimensional graphics object in less detail than the input mesh, the geometry, the dataset vertices of the input mesh received by the vertex shader and the geometry shader in three passes, the data set input to the graphics-processing unit in a first pass and a third pass of the three passes, wherein a mesh triangle in each pass through the pipeline is accessed once, wherein multiple levels of detail are computed for the input mesh without repeating each of the passes, wherein a cluster is computed for each vertex of the input mesh at the first pass of the three passes, wherein at a second pass of the three passes an optimal vertex position of each cluster is computed and stored for use in the third pass, and wherein the probabilistic octree is generated in the first pass of the multiple passes.

12. The graphics-processing unit of claim 11, wherein the vertex shader is configured to:
divide the input mesh into a grid of cells;
map each vertex of the input mesh to the grid cell in which that vertex lies; and
assign each grid cell to a memory location;
and wherein the geometry shader is configured to:
compute an error quadric for each vertex; and
accumulate the error quadric computed for each vertex in the memory location assigned to the grid cell to which that vertex maps.

13. The graphics-processing unit of claim 12, further comprising a pixel shader configured to compute a representative vertex position for each grid cell based on the error quadric accumulated for that grid cell.

14. The graphics-processing unit of claim 13, wherein the geometry shader is configured to:
remap vertices of the input mesh to the representative vertex positions in the third pass of the multiple passes;
remove degenerate primitives that result from remapping the vertices to leave new primitives that produce the simplified mesh; and
store the simplified mesh in a stream out buffer for use in a subsequent rendering pass.

15. The graphics-processing unit of claim 11, wherein the simplified mesh includes the multiple levels of detail.

16. The graphics-processing unit of claim 12, further comprising means for generating the grid of cells by performing a projective warping to a uniform rectilinear grid based on a camera position to produce a grid with cells of different volumes in accordance with the camera position.

17. The graphics-processing unit of claim 12, further comprising means for applying a warping function to the input mesh based on a weighting function to warp the input mesh before the input mesh is divided into a grid of cells.

18. The graphics-processing unit of claim 12, further comprising means for dynamically receiving user input identifying a region of interest in the input mesh, and for applying a warping function to the grid at the region of interest in accordance with a select weighting function.

19. The graphics-processing unit of claim 11, further comprising a user interface by which a user can interactively issue commands that perform mesh simplification of the input mesh.

20. The graphics-processing unit of claim 12, further comprising:
means for subdividing the input mesh into a grid of cells with multiple levels of resolution;
a fixed amount of memory locations allocated for each level of resolution; and
means for randomly selecting one of the levels of resolution for each vertex of the input mesh;
and wherein the geometry shader is configured to:
compute an error quadric for each vertex; and
store the error quadric computed for each vertex in a given memory location allocated for the level of resolution randomly selected for that vertex if the given memory location is not currently storing the error quadric of another vertex.

21. A non-transitory computer-useable medium storing computer-readable instructions, wherein the computer-readable instructions when executed on a computer causes a graphics-processing unit of the computer to decimate a data set for an input mesh that describes a three dimensional object, to provide the data set for the input mesh in three passes through a pipeline of the graphics-processing unit, the data set input to the graphics-processing unit in a first pass and a third pass of the three passes, wherein each mesh triangle in each pass through the pipeline is accessed once, to compute multiple levels of detail for the input mesh without repeating each of the multiple passes; and to produce a simplified mesh that describes the three-dimensional graphics object in less detail than the input mesh, wherein a cluster is computed for each vertex of the input mesh at the first pass of the three passes, wherein at a second pass of the three passes an optimal vertex position of each cluster is computed and stored for use in the third pass, the data set including data that is represented by a probabilistic octree on the graphics-processing unit, wherein the probabilistic octree is generated in the first pass of the multiple passes.

22. The computer-useable medium of claim 21, wherein the computer-readable instructions comprise hardware description language instructions.

* * * * *